United States Patent
Giacobbe et al.

(10) Patent No.: US 6,531,105 B1
(45) Date of Patent: Mar. 11, 2003

(54) PROCESS AND APPARATUS FOR REMOVING CARBON MONOXIDE FROM A GAS STREAM

(75) Inventors: Frederick W. Giacobbe, Naperville, IL (US); Eric L. Duchateau, Clarendon Hills, IL (US); Kevin P. McKean, Flower Mound, TX (US)

(73) Assignees: L'Air Liquide-Societe Anonyme a'Directoire et Conseil de Surveillance pour l'Etude et l'Exploitation des Procedes Georges Claude, Paris (FR); American Air Liquide, Inc., Fremont, CA (US); Air Liquide America Corporation, Houston, TX (US)

( * ) Notice: Subject to any disclaimer, the term of this patent is extended or adjusted under 35 U.S.C. 154(b) by 0 days.

(21) Appl. No.: 08/609,255

(22) Filed: Feb. 29, 1996

(51) Int. Cl.[7] .................................. B01D 53/62
(52) U.S. Cl. ..................... 423/247; 423/437.2
(58) Field of Search ............. 423/437 M, 247, 423/248, 213.5

(56) References Cited

U.S. PATENT DOCUMENTS

| | | | |
|---|---|---|---|
| 3,758,666 A | | 9/1973 | Frevel et al. ............ 423/247 |
| 3,919,120 A | * | 11/1975 | Kato et al. ............ 423/213.5 |
| 4,003,979 A | * | 1/1977 | Kanno ..................... 423/247 |
| 4,808,394 A | | 2/1989 | Kolts et al. ............. 423/437 |
| 4,816,237 A | * | 3/1989 | Tomomura et al. ...... 423/247 |
| 4,869,883 A | * | 9/1989 | Thorogood et al. ..... 423/247 |

(List continued on next page.)

FOREIGN PATENT DOCUMENTS

| | | | | |
|---|---|---|---|---|
| AU | 34059/93 | | 9/1993 | |
| CA | 2045060 | * | 1/1992 | |
| DE | 242181 | * | 1/1987 | ............ 423/248 |
| EP | 0 598 384 A1 | | 5/1994 | |
| EP | 606081 | * | 7/1994 | ............ 423/247 |
| JP | 5-277362 | * | 10/1993 | |
| JP | 5-337319 | * | 12/1993 | |
| WO | WO 93/21350 | | 10/1993 | |

OTHER PUBLICATIONS

BASF Technical Leaflet for "Catalyst R3–11", author unknown, Oct. 1986.*
Official Translation of Japanese Kokai 05–277,362 (Hosaka, et al.), Oct. 1993.*
Official Translation of Japanese Kokai 05–337,319 (Nippon Sanso K.K.), Dec. 1993.*

*Primary Examiner*—Steven Bos
*Assistant Examiner*—Maribel Medina
(74) *Attorney, Agent, or Firm*—Linda K. Russell (57) ABSTRACT

Apparatus and process for removing carbon monoxide from a gas stream comprising a major portion of an inert gas and a minor portion of carbon monoxide are provided. The process involves contacting a feed gas stream with at least a primary metal oxide in a reaction zone of a reactor vessel at conditions effective to convert substantially all of the carbon monoxide to carbon dioxide, thus producing a purified gas stream consisting essentially of the inert gas and carbon dioxide and substantially free of carbon monoxide. This process has (inter alia) a particular application as a tertiary purification process for producing a more highly purified source of gaseous nitrogen from a source of nitrogen originally produced from a conventional membrane air separation system, wherein the oxygen concentration in the nitrogen stream my vary around a setpoint value, and then further (or secondarily) purified by converting excess oxygen in the nitrogen to carbon monoxide and carbon dioxide using a fuel gas/combustion process, wherein the carbon monoxide concentration varies due to varying oxygen concentration in the feed stream to the combustion process.

17 Claims, 2 Drawing Sheets

U.S. PATENT DOCUMENTS

| | | | |
|---|---|---|---|
| 4,991,181 A | 2/1991 | Upchurch et al. | 372/59 |
| 5,110,569 A * | 5/1992 | Jain | 423/427 |
| 5,182,088 A | 1/1993 | Leondaridis et al. | 423/210 |
| 5,221,369 A | 6/1993 | Bowe et al. | 148/208 |
| 5,242,509 A | 9/1993 | Rancon et al. | 148/206 |
| 5,254,180 A | 10/1993 | Bonner et al. | 148/208 |
| 5,259,893 A | 11/1993 | Bonner et al. | 148/208 |
| 5,284,526 A | 2/1994 | Garg et al. | 148/208 |
| 5,290,480 A | 3/1994 | Garg et al. | 423/351 |
| 5,298,089 A | 3/1994 | Bowe et al. | 266/81 |
| 5,298,090 A | 3/1994 | Garg et al. | 266/81 |
| 5,302,213 A | 4/1994 | Bonner et al. | 148/208 |
| 5,318,759 A | 6/1994 | Campbell et al. | 423/351 |
| 5,320,818 A | 6/1994 | Garg et al. | 423/351 |
| 5,322,676 A | 6/1994 | Epting | 423/351 |
| 5,333,776 A | 8/1994 | Garg et al. | 228/219 |
| 5,342,455 A | 8/1994 | Bonner et al. | 148/208 |
| 5,348,592 A | 9/1994 | Garg et al. | 148/208 |
| 5,348,593 A | 9/1994 | Bowe et al. | 420/507 |
| 5,401,339 A | 3/1995 | Garg et al. | 148/629 |
| 5,417,774 A | 5/1995 | Garg et al. | 148/208 |

* cited by examiner

PROCESS AND APPARATUS FOR REMOVING CARBON MONOXIDE FROM A GAS STREAM

BACKGROUND OF THE INVENTION

1. Field of the Invention

The present invention relates to a process for the removal of carbon monoxide from a gas comprising a minor portion of carbon monoxide and a major portion of an inert gas, such as nitrogen.

2. Description of Related Art

Conventional membrane systems employed to produce gaseous nitrogen from air typically produce high purity nitrogen gas. The nitrogen purity level can be greater than 99 volume percent. The flow rate at high purity levels, however, tends to be too low to be useful because energy requirements escalate significantly with increasing purity levels of nitrogen. Therefore, this method of producing high purity nitrogen gas is not very efficient.

Alternatively, the membrane system can be operated more economically by increasing the outlet flow rate of the purified nitrogen. The effect of a higher nitrogen outlet flow rate is that higher concentrations of oxygen, as well as other impurities, are entrained in the "purified" nitrogen gas stream, thus producing a nitrogen gas stream of lower purity. If the membrane system is operated at a high outlet nitrogen flow rate, the most objectionable impurity in the nitrogen gas stream is oxygen. Oxygen is harmful in most uses of the nitrogen as an inert gas because oxygen is an oxidizer. Therefore, the presence of oxygen is not desirable in an inert gas environment or in a gas to be used to produce a reducing atmosphere, which is required in many applications such as in heat treating metal parts.

Another problem with membrane separators is that the concentration of oxygen in the nitrogen product stream is not constant from moment to the next moment, that is, if the setpoint or target oxygen concentration in the nitrogen stream is 2 volume percent, the concentration of oxygen may actually vary over time from 1.8 volume percent or lower and up to 2.2 volume percent or higher.

The residual oxygen in a nitrogen gas stream outlet from a membrane generator may be removed by combustion with methane or some other hydrocarbon within a chemical reactor containing a hot active catalyst which is capable of facilitating the reaction of oxygen with the hydrocarbon, thus "burning out" or combusting the residual oxygen. However, even when using the best operating parameters, burning the residual oxygen with a hydrocarbon may produce other impurities such as carbon dioxide, carbon monoxide, and water vapor. This process is well known and is described in U.S. Pat. No. 5,242,509 to Rancon et al.

The carbon dioxide and water vapor impurities are relatively inert and, thus, are not objectionable in many subsequent uses of this purified nitrogen gas mixture. The carbon monoxide impurity, however, is a reducing agent and, potentially, a poisonous contaminant. This problem may be a severe impediment to the use of purified nitrogen produced by burning residual oxygen impurities out of a contaminated source of nitrogen. Moreover, if the feed to the chemical reactor is the nitrogen product stream from a membrane purifier, as stated previously the oxygen content of the nitrogen stream varies from moment to moment, and thus the carbon monoxide impurity will vary from zero to some positive value.

Consequently, several processes have been developed to remove carbon monoxide from a gas such as air, argon, or nitrogen. For example, U.S. Pat. No. 3,758,666 to Frevel et al. discloses a process for removing carbon monoxide from air by initial adsorption and subsequent oxidation to carbon dioxide on the surface of a catalyst. The catalyst comprises metallic palladium on an alumina support.

Another example of such a process is described in U.S. Pat. No. 4,808,394 to Kolts et al. This patent discloses the use of a catalyst which facilitates the oxidation of carbon monoxide with free oxygen to carbon dioxide. The disclosed catalyst is reduced platinum and/or palladium on an alumina support.

Other patents describe a process of reacting carbon monoxide with oxygen gas to produce carbon dioxide using different types of catalysts. For example, U.S. Pat. No. 4,991,181 to Upchurch et al. discloses a catalyst containing a platinum group metal (in a reduced condition) and a reducible metal oxide. The metallic element in these reducible metal oxides may be tin, titanium, manganese, copper, or cesium.

In all of the above processes, the noble metal catalytic component was in a reduced or metallic state. Therefore, it was necessary to add oxygen gas to the feed gas stream in order to promote the conversion of carbon monoxide to carbon dioxide. The oxygen source was either in the starting gas stream itself or, more typically, from an outside gas stream. In addition to oxygen gas, these processes require hydrogen to regenerate (or reduce) the platinum or palladium component of the catalyst. Obviously, the addition of oxygen and hydrogen gases increases the cost of such processes.

In view of the above prior art processes, a need exists in the art for an efficient and economical membrane purification process to produce a high purity inert gas stream which is free of undesirable impurities such as oxygen and carbon monoxide. More particularly, a need exists in the art for a process that effectively removes carbon monoxide from an inert gas stream without the need for using hydrogen or an added oxygen gas, and without regard to the flow rate of the inert gas.

SUMMARY OF THE INVENTION

In accordance with the present invention, apparatus and process are provided for purifying a stream of nitrogen or another inert gas contaminated with carbon monoxide so as to minimize the reducing effect of carbon monoxide and its potential threat of toxicity.

In one aspect of the present invention, a process is presented for removing substantially all carbon monoxide from a gas stream comprising a major amount of an inert gas (preferably nitrogen) and a minor amount of carbon monoxide, which amount of carbon monoxide may be varying from substantially zero to a positive amount. In one embodiment, the process comprises contacting the gas stream with a metal oxide in a reaction zone at conditions effective to convert substantially all of the carbon monoxide to carbon dioxide and thus produce a purified gas stream substantially free of carbon monoxide. Preferably, the metal oxide is selected from the group consisting of palladium oxides, platinum oxides, and nickel oxides.

A second aspect of the present invention is an apparatus for removing carbon monoxide from a gas stream comprising a major amount of an inert gas and a minor amount of carbon monoxide. The apparatus comprises a reactor vessel, a reactor vessel gas inlet and a reactor vessel gas outlet, the reactor vessel having an internal reaction zone space at least partially filled with a metal oxide, the metal oxide present in sufficient volume for contacting the gas stream with the metal oxide at conditions effective to convert substantially all of the carbon monoxide to carbon dioxide and thus produce a purified gas stream substantially free of carbon monoxide.

Preferably the reactor vessel includes an oxidizing gas inlet and an oxidizing gas outlet, allowing the residual metal which was formerly oxidized to be regenerated and form anew the metal oxide. Particularly preferred are methods and apparatus of the invention wherein two or more reactor vessels are arranged in parallel flow relationship with respect to the gas stream from which carbon monoxide is to be removed. In the case where there are two reactor vessels in parallel, a first reactor vessel can be functioning in the carbon monoxide removal mode, while a second reactor vessel is being regenerated, as is further described herein.

The apparatus and process of the present invention provide a more efficient and economical means for removing carbon monoxide from nitrogen or another inert gas by using one or more metal oxide reactors. One advantage of the inventive apparatus and process is that means are provided for removing carbon monoxide from a feed stream of nitrogen or another inert gas without the addition of hydrogen or oxygen gas to the feed gas stream, and without regard to the flow rate of the feed gas stream. Also, it does not matter if the feed gas stream to the reactor vessel of the inventive apparatus varies in carbon monoxide concentration, thus solving a major problem with previous methods.

The product gas stream from the process and apparatus of the present invention has a variety of uses, including heat treatment atmospheres, electronics packaging atmospheres for processes such as wave soldering and reflow soldering, as well as others which may be envisioned by those skilled in the art.

These and other objects of the present invention will become apparent after reviewing the following description of preferred embodiments and the appended drawing.

DESCRIPTION OF PREFERRED EMBODIMENTS

The process of the present invention comprises the use of a gas processing step that can be employed to remove objectionable amounts of carbon monoxide from any inert gas contaminated by carbon monoxide. However, one preferred use for this process is in removing carbon monoxide from a nitrogen gas stream which has been produced by membrane separation of air (wherein the oxygen concentration in the nitrogen stream may vary) and then treated in a hydrocarbon processing (i.e., combustion) step to remove residual oxygen to produce a stream containing essentially nitrogen, carbon monoxide, and carbon dioxide.

Specifically, the present invention relates to a process for removing carbon monoxide from a feed gas stream comprising a major amount of an inert gas and a minor amount of carbon monoxide. The inert gas is preferably nitrogen. The maximum amount of carbon monoxide in the feed gas stream that may be removed by the process and apparatus of the present invention may be greater than 5000 ppmv (i.e., parts per million, by volume and hereinafter referred to simply as ppm), for example F1 from about 30 to about 50,000 ppm or from 50 to 30,000 ppm, but preferably it is 500 ppm or lower. The carbon monoxide concentration in the feed stream may vary if the feed stream is the product nitrogen gas stream from a hydrocarbon processing step.

The inventive process comprises contacting the feed gas stream with a metal oxide in a reaction zone at conditions effective to convert substantially all of the carbon monoxide present in the feed gas stream to carbon dioxide, thus producing a purified gas stream consisting essentially of the inert gas and some carbon dioxide. The purified gas stream is substantially free of carbon monoxide. As used herein the phrase "substantially free of carbon monoxide" depends on the end use of the purified gas; however, the term "substantially free" means that the amount of carbon monoxide in the purified gas stream is less than 5 ppm, or more preferably less than 1 ppm. This is true even if the carbon monoxide concentration in the feed gas stream varies. To decrease the amount of carbon monoxide in the purified gas stream, one would either use more metal oxide, increase the residence time of the feed gas in the reactor vessel, or both. Increasing temperature and/or pressure, while kinetically favoring the reaction between carbon monoxide and oxygen to produce carbon dioxide, must be carefully monitored in practice. Among other problems that might be created, increasing temperature too much might be detrimental to the conversion process due to possible sintering of the ceramic support material, and increasing pressure too much would require more costly pressure vessels.

I. METAL OXIDES

The metal oxide is preferably selected from noble metal oxides such as palladium oxides (e.g., PdO, $PdO_2$) and platinum oxides (e.g., PtO and $PtO_2$), with palladium oxides being the most preferred. Nickel oxides (e.g., NiO, $NiO_2$) may also be used. (The palladium, platinum, and nickel oxides are also referred to herein as "primary" metal oxides to distinguish them from promoter metal oxides, discussed herein.) Mixtures of metal oxides can also be employed, meaning that mixtures of oxides of a single metal atom may be used. Binary mixtures such as PtO/PdO, $PtO_2/PdO_2$, $PtO/PdO_2$, NiO/PtO, and the like, as well as ternary mixtures such as PtO/PdOINiO, $PtO_2/PdO_2/NiO_2$, $PtO/PdO_2/NiO$, $NiO/PtO/NiO_2$, and the like may be employed. The metal oxide may generally be denoted $MO_x$, wherein M designates a metal atom, O designates an oxygen atom, and x designates the number of oxygen atoms bonded to each metal atom.

When speaking of the total metal oxide present in the reaction zone of the reactor vessel, one may represent the metal oxide present at any given time as $MO_x$, wherein x may range from zero when the oxygen has been completely depleted, up to 2 when the metal oxide is fully regenerated. At any given time between these two extremes, the metal oxide may be present as, for example, $MO_{0.5}$, $MO_{1.1}$, $MO_{1.7}$, and the like.

If mixtures of metal oxides of two different metal atoms are employed, the weight percentage of the first metal atom to the total weight of metal atoms present may range from I to 99 weight percent, more preferably ranging from about 30 to 70 weight percent.

Metal oxides commonly referred to as "promoters", such as disclosed in U.S. Pat. No. 5,182,088 (incorporated herein by reference), which discloses use of CuO promoted with AgO, HgO, or CdO, may be present in conjunction with the above-mentioned metal oxides. If such promoter metal oxides are present, the weight percentage of promoter metal oxide to "primary" metal oxide (i.e. oxides of Pt, Pd and Ni) is at least about 0.01 weight percent, more preferably at least about 0.1 weight percent. Generally, it is unnecessary to use more than about 10 weight percent of the promoter. Most preferably, the promoter is present at a weight ranging from about 0.2 to about 5 weight percent of the total weight of promoter and primary metal oxide.

When promoter metal oxides are employed, the primary metal oxide of choice and the promoter metal oxide of choice are preferably prepared by coprecipitating both in the desired amounts, drying the material to a powdered form and then pressing the composition into tablets. A binder may be used for the pressing step, if necessary. Each of these steps are, individually, known to those skilled in the art and pose no unusual manufacturing problems.

The amount of fully reduced noble metal on the support material preferably ranges from about 0.01 to about 10.0 percent by weight of the support material, more preferably ranging from about 0.1 to 1.0 percent by weight based on weight of fully reduced noble metal on the support material, and most preferably the fully reduced noble metal is present in an amount of about 0.5 percent by weight based on the weight of the support material.

While not wishing to be bound by any particular theory, it is believed that the reaction of carbon monoxide with the metal oxide to produce carbon dioxide occurs because the carbon monoxide actually removes oxygen that had previously combined with the metal to create the metal oxide. The metal oxide, therefore, is a source of oxygen for the carbon monoxide and does not act as a catalyst. The metal oxide is considered a chemical reactant and not a catalyst because it is consumed during the reaction. During the reaction, the metal oxide changes from an oxide to a reduced metal.

Noble metal oxides are preferred over other types of metal oxides for two primary reasons. First, oxygen reacts with certain noble metals to produce noble metal oxides. Second, noble metal oxides are relatively unstable compared to other metal oxides, such as iron oxide or chromium oxide. The instability of noble metal oxides means that the conversion of carbon monoxide to carbon dioxide can be carried out at lower temperatures because the noble metal oxide gives up its combined oxygen to form carbon dioxide from carbon monoxide more readily than other kinds of metal oxides.

II. METAL OXIDE SUPPORT MATERIALS

The noble metal oxide can be supported on any material well known in the art. A non-limiting list of examples of suitable support materials include those selected from the group of aluminas, aluminosilicates, silicas, silica-alumina mixtures, kieselguhr, titania extrudate, and mixtures of these. Alumina (aluminum oxide) is the most preferred support material. Aluminum oxide is commercially available in many forms, including brown, blue, ceramic, heat-treated, and fused aluminum oxide. All of these may be used as the catalyst support, or any combination thereof.

In the practice of the present invention, the metal oxide plus support is typically placed in a contactor of any shape, preferably a tubular shape, and the feed gas stream passed therethrough, entering one end of the tube and exiting out the other end of the tube. The metal oxide and support is typically available as a particulate material, and the size of the particulate material generally and preferably ranges from about 1.0 micrometer to about 10.0 micrometers, and preferably does not exceed $\frac{1}{5}$ of the effective diameter of the contactor. It is more preferred that the support size be no more than about $\frac{1}{10}$ of the effective diameter of the contactor.

In some apparatus and process embodiments, it may be preferred to position support material (without "catalyst" thereon) upstream of, or downstream of, or both upstream and downstream of the metal oxide/catalyst bed. One advantage for upstream placement: the plain support is less expensive than the metal oxide-loaded material, and in the upstream position it can act as a high area preheat zone to preheat the gases before they come in contact with the metal oxide-loaded support. Using the metal oxide-loaded material for this preheating process is uneconomical. Of course, there are other ways to preheat the gases but this method allows all preheating and "reacting" to occur within one vessel. An advantage for downstream placement: downstream placement of the plain support material creates another preheat section for incoming gases if the flow direction must be reversed for any reason during the process or during any periodic "cleaning" steps that must be performed within the system. For example "carbon fouling" sometimes occurs within reactive systems employing hydrocarbons or carbon monoxide and this carbon must be "burned out" in a separate step using heat and very low concentrations of oxygen in an inert gas.

III. PROCESS CONDITIONS

A. Conversion of Carbon Monoxide to Carbon Dioxide

The conversion of carbon monoxide in the feed gas stream to carbon dioxide proceeds at elevated temperatures in the reaction zone of the reactor vessel (in other words, in the presence of the metal oxide), preferably at temperatures ranging from about ambient (about 25° C.) to about 350° C., more preferably ranging from about 100 to about 300° C. The pressure in the reaction zone of the reactor vessel preferably ranges from about 1 atm to about 15 atm (approx. 101 kPa to about 1520 kPa), with higher pressures tending to be more favorable than lower pressures. However, a more preferred pressure range (if the original source of impure gas is a membrane system) ranges from about 3 atm to about 10 atm (approx. 304 kPa to about 1013 kPa).

The process and apparatus of the invention can be operated at almost any gaseous feed gas flow rate, so long as a sufficient quantity of hot metal oxide remains in the reaction zone. Feed gas flow rates as low as 1.0 standard cubic foot per hour (scfh - 1.0 atm and 70° F.) (0.02628 meters$^3$/hour–1.0 atm and 0.0° C.) at 0.9 pounds per square inch gauge (psig) (108 kPa) and at 250° C. (using 46.8 g of 0.5 weight percent palladium deposited on an alumina support) and as high as 56.9 scfh (1.50 meters$^3$/hour) at 75.5 psig (622 kPa) and at 250° C. (using 15.6 g of 0.5 weight percent palladium deposited on alumina support) have been tested, with no significant differences in performance. Highest flow rates and pressures are preferred because these conditions maximize the efficiency of the processing system.

As previously mentioned, the apparatus of the invention may have one or more reactors or reactor vessels, at least one of which contains the oxidized metal. The reactor vessels can be operated continuously or batchwise.

The feed gas stream may have a constant carbon monoxide concentration, or a varying carbon monoxide concentration. One advantage of the process and apparatus of the invention is that if this carbon monoxide concentration varies (for example because the oxygen concentration in the nitrogen stream from a membrane separator is varying between ±1 volume percent of setpoint or target) the process and apparatus of the invention will remove substantially all of the carbon monoxide to form a stream of nitrogen and carbon dioxide.

Purified gas streams produced according to the present invention preferably comprise less than about 1.0 ppm of carbon monoxide, more preferably less than 0.5 ppm of carbon monoxide.

B. Regeneration of Reduced Metal Oxide

Unless a continuous supply of oxygen is mixed with the carbon monoxide containing feed gas stream, the conversion of carbon monoxide to carbon dioxide ceases when the metal oxide has been completely reduced. Therefore, after the conversion of carbon monoxide has progressed so that a major portion of the metal oxide becomes reduced, the carbon monoxide to carbon dioxide conversion process should be stopped.

An oxygen-containing regeneration gas, preferably an oxygen-rich regeneration gas, is then introduced into the reaction zone to regenerate the reduced metal. The regeneration gas passing through the partially or completely reduced bed of the metal oxide and re-oxidizes it. After regeneration is complete, the oxidation of carbon monoxide may resume.

The regeneration gas preferably contains a sufficient concentration of oxygen to allow a reasonably rapid conversion (or reconversion) of the reduced (or partially reduced) metal oxide back to the metal oxide form. However, pure oxygen is preferably avoided during this re-oxidation process because a rapid (and generally uncontrollable) oxidation reaction, accompanied by a significant system temperature increase, may decrease the effective surface area of the metal oxide deposited on the inert support (e.g., on the alumina) by sintering or partially melting some of this composite material. This decrease in effective surface area may permanently damage the efficiency of the reactant bed.

Generally, the regeneration gas comprising inert gases (such as nitrogen, argon, helium, and the like) containing up to about 2.0 percent oxygen (by volume) can safely be used to oxidize (or re-oxidize) fully reduced active metals dispersed (in relatively low weight percentages) upon inert support materials. Of course, it will be readily understood by those skilled in the art that system operating temperatures and pressures must also be considered when employing this type of process. In other words, there are many possible conditions that may be safely employed during the oxidation process. These conditions will depend upon the particular system dimensions, active and inert material and containment vessel properties, as well as on convenient and desirable operating parameters. In any case, one may easily estimate maximum possible temperature increases that can be expected due to this type of oxidation reaction by properly employing standard thermodynamic property information as well as oxygen concentrations, gas flow rates, system pressures, and relevant system heat capacity data.

In several actual experimental regeneration test trials, a gaseous mixture of nitrogen containing oxygen (in concentrations ranging from about 50 to about 100 ppm) was employed to re-oxidize a bed of fully reduced palladium (0.5 percent by weight) supported on an alumina substrate. This material was enclosed within a stainless steel reactor vessel and was heated to about 250° C. prior to the introduction of the oxidizing gas at a flow rate of about 2.0 scfh (0.0526 meters$^3$/hour) and at a pressure slightly greater than 1.0 atm (about 101.3 kPa). A thermocouple, within the center of the bed of the reduced metal, exhibited no significant temperature increases during the entire regeneration process. Of course, at higher oxygen concentrations, a hot zone (the site of the oxidation process which actually moves through the system bed in the same direction as the regeneration gas flow), and more significant bed temperature increases can be expected. However, one can control this temperature increase very precisely by controlling all regeneration parameters.

A preferred regeneration condition is to use nitrogen (or any other inert gas) containing about 0.5 to 2.0 percent oxygen as the regeneration gas and to pass this gas mixture at about 1.0 to 3.0 atm (about 101.3 to 304 kPa) through the bed of reduced metal oxide that has been allowed to cool to about 200° C. A rapid re-oxidation process without a damaging increase in system temperature will occur.

Alternatively, instead of permitting a major portion of the metal oxide to become reduced, an oxygen-containing gas stream may be introduced into the reaction zone along with the feed gas stream to regenerate the metal oxide in situ. In this embodiment, the amount of metal oxide that has been reduced does not reach an unacceptable level. Thus, the purification process can be carried out continuously. And, in this case, the metal oxide acts as a true catalyst.

IV. DISCUSSION OF THE DRAWING

Figure 1:
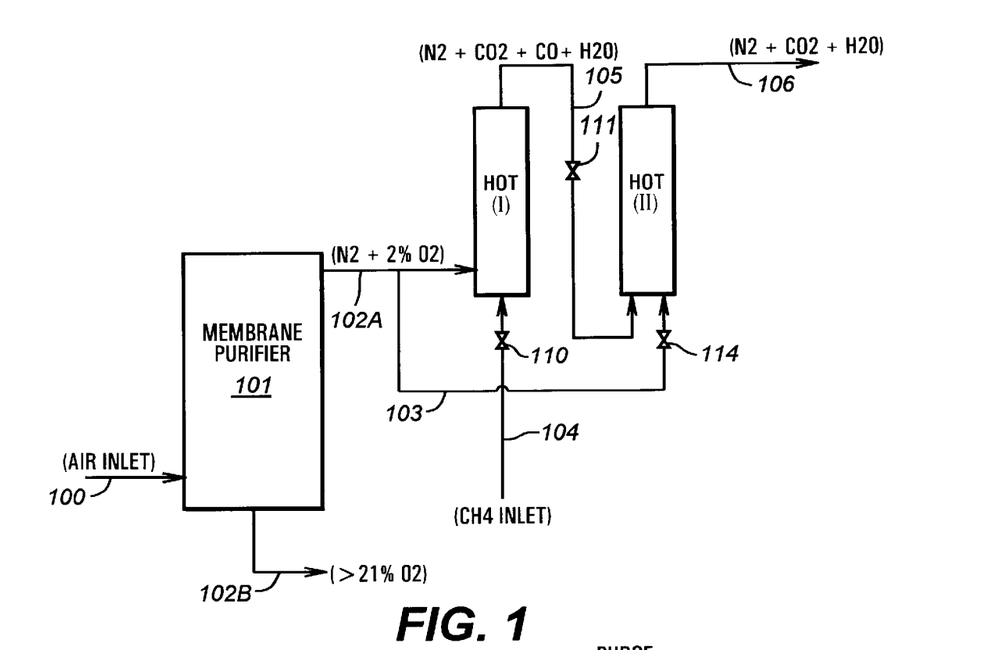
FIG. 1 is a schematic flow diagram (reduced in scale) for the removal of carbon monoxide from a feed gas stream with an apparatus in accordance with the present invention.

Turning now to the drawing figures, FIG. 1 illustrates a mode of removing residual oxygen from a stream of nitrogen initially separated from a source of compressed air using a membrane purification system. A feedstream 100 of compressed air is fed to a membrane purifier 101. The compressed air contains approximately 78 percent nitrogen, 21 percent oxygen, and 1.0 percent argon. Membrane purifier 101 produces a permeate stream 102A rich in nitrogen and containing about 0.5 to 5.0 percent oxygen and negligible amounts of other impurities or inert gases such as argon. The permeate stream 102 A preferably contains less than 2.0 percent oxygen. However, the concentration of oxygen in stream 102A may vary from ±1 volume percent of setpoint or target.

Permeate stream 102A is then mixed with a fuel gas 104, preferably methane, within a heated catalyst bed (I) in order to burn substantially all of the residual oxygen. The catalyst in catalyst bed (I) may be a noble metal catalyst, such as platinum or palladium, as described in U.S. Pat. No. 5,242,509, incorporated by reference herein, operated at a temperature ranging from about 400 to about 900° C. The resulting gas stream 105 exiting the heated catalyst bed (I) contains nitrogen and impurities such as carbon monoxide, carbon dioxide, water vapor, and small quantities of methane and argon. The concentration of carbon monoxide in the resulting gas stream 105 may range from about 50 to 500 ppm, or higher.

The resulting gas stream 105 is then passed to a reactor bed (II) comprising a metal oxide that is capable of converting substantially all of the carbon monoxide to carbon dioxide. After the conversion, a product gas stream 106 leaves reactor bed (II) and consists essentially of nitrogen, carbon dioxide, and water vapor. The carbon dioxide and water vapor can be removed easily in a subsequent adsorption step or process (not illustrated) to produce a more purified nitrogen gas stream.

Preferably the methane added to catalyst bed I (through gas stream 104) is only slightly in excess of the exact stoichiometric quantity needed to completely react with the excess oxygen in stream 102, and if stream 102A contains about 98 percent nitrogen and 2.0 percent oxygen, the gas mixture leaving catalyst bed I (105) will consist essentially of approximately 97 percent nitrogen, 1.0 percent carbon dioxide, 2.0 percent water vapor, small quantities of carbon monoxide (about 50 to 5,000 ppm), and very small quantities of other impurities such as argon and traces of methane.

The stoichiometric reaction between methane and oxygen, at elevated temperatures, is:

$$CH_4(g)+2O_2(g)=CO_2(g)+2H_2O\ (g)$$

Figure 3:
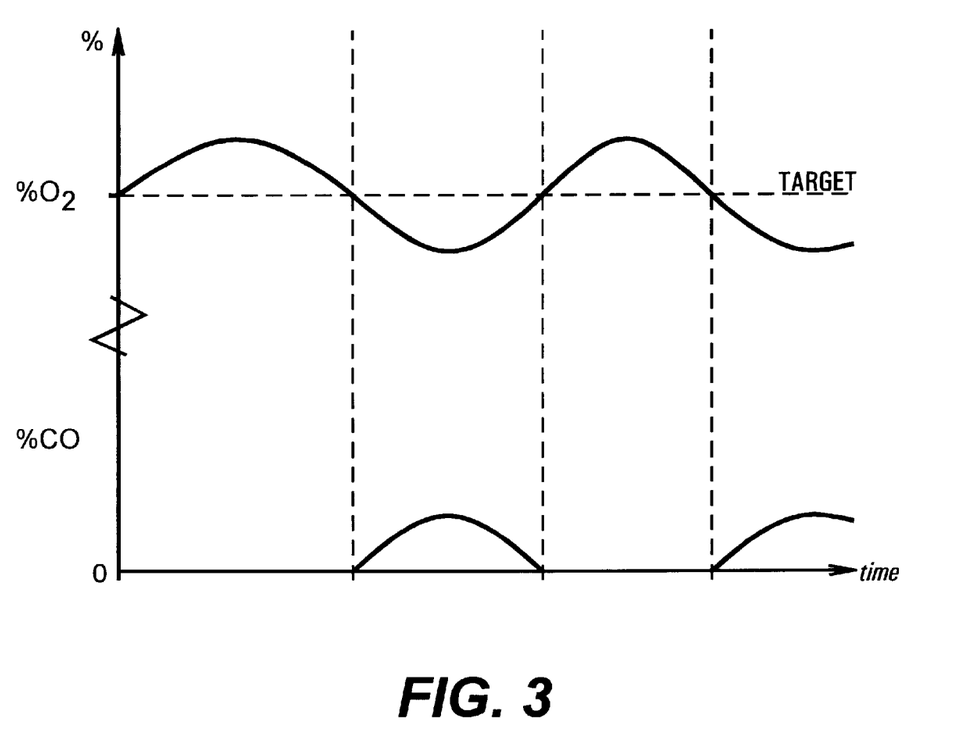
FIG. 3 illustrates in graphical form the consequence of a varying oxygen concentration in the impure nitrogen feed to a prior art catalytic reactor.

However, carbon monoxide tends to form during the combustion of any hydrocarbon when there is an excess (more than stoichiometric) quantity of the hydrocarbon over the amount needed to react completely with all of the oxygen actually present. This is illustrated graphically in FIG. 3. In FIG. 3, the concentration of oxygen in the feedstream 102A to the catalytic reactor is plotted against time. Also, the concentration of carbon monoxide in stream 105 is plotted against time. It can be appreciated that as the concentration of oxygen varies, for example cyclicly around a setpoint concentration of 2 volume percent in the product stream of nitrogen from a membrane air separator, the amount of carbon monoxide in feed stream 105 will vary between zero and a positive value. Advantageously, the process and apparatus of the present invention may be operated to remove carbon monoxide from the feed stream 105 even if the concentration of carbon monoxide varies, as illustrated.

While reactor bed (II) can be operated without an added gas stream containing oxygen, a portion 103 of the permeate stream 102A can be bypassed around the heated catalyst bed (I) by opening valve 114 and combining it with the carbon monoxide-containing gas stream 105 exiting the heated catalyst bed (I) to regenerate the reduced metal, which is formed during the conversion of carbon monoxide to carbon dioxide, in situ. Thus, if a portion of stream 103 is passed to reactor bed (II) simultaneously with stream 105, the conversion of carbon monoxide to carbon dioxide in reactor bed (II) can be carried out continuously and without the need to take reactor bed (II) off-line to regenerate the reduced metal.

In an alternative embodiment, the flow of stream 105 could be stopped by closing valve 111 when the metal oxide in reactor bed (II) becomes reduced to an unacceptable level, and a portion 103 of the permeate stream 102A can then be introduced directly into reactor bed (II) to regenerate the reduced metal, again by opening valve 114. During regeneration, all or substantially all of the oxygen in stream 103 reacts with the reduced metal to form the metal oxide. It should be noted that the reduced metal is also a very good reactant with the oxygen. As a result, the regeneration effluent from reactor bed (II) comprises substantially pure nitrogen, which can be combined with the product gas stream 106. Further, rather than stream 103, stream 102B could be used to regenerate the reactor bed (II) if temperature is controlled so as to avoid overheating the support material.

Special Comments Regarding FIG. 1:

| Gas | Bed I | Bed II |
|---|---|---|
| Approximate Moles of Specific Gas Leaving: | | |
| Nitrogen | A | A |
| Carbon Dioxide | B | B + C |
| Carbon Monoxide | C | Zero (less than 0.5 ppm) |

-continued

Special Comments Regarding FIG. 1:

| Gas | Bed I | Bed II |
|---|---|---|
| Water Vapor | D | D |
| Total Moles | N = A + B + C + D | N = A + (B + C) + D |
| Approximate Volume (or Mole) Percentages of Gases Leaving: | | |
| Nitrogen | 100 (A/N) | 100 (A/N) |
| Carbon Dioxide | 100 (B/N) | 100 (B + C)/N |
| Carbon Monoxide | 100 (C/N) | Zero (less than 0.5 ppm) |
| Water Vapor | 100 (D/N) | 100 (D/N) |

Note:
Volume and Mole Percentages are the Same:

Changes in the specific gas concentrations leaving beds I and II mainly involve carbon dioxide and carbon monoxide. In fact, the carbon dioxide concentration leaving bed II is only slightly higher than its concentration in the gas stream leaving bed I, but changes in the carbon monoxide concentration are preferably much greater. For example, if the initial carbon dioxide and carbon monoxide concentrations leaving bed I are about 20,000 and 500 ppm (respectively), then the final carbon dioxide and carbon monoxide concentrations leaving bed II will be approximately 20,500 and less than 0.5 ppm (respectively). This change in the carbon dioxide concentration ratio may be designated by the factor of 20,500/20,000 or about 1.025 (i.e., there is only a slight increase in the carbon dioxide concentration). The corresponding change in the carbon monoxide concentration ratio is approximately 0.5/500 or 0.001 (i.e., there is a one thousand fold decrease in the carbon monoxide concentration).

Figure 2:
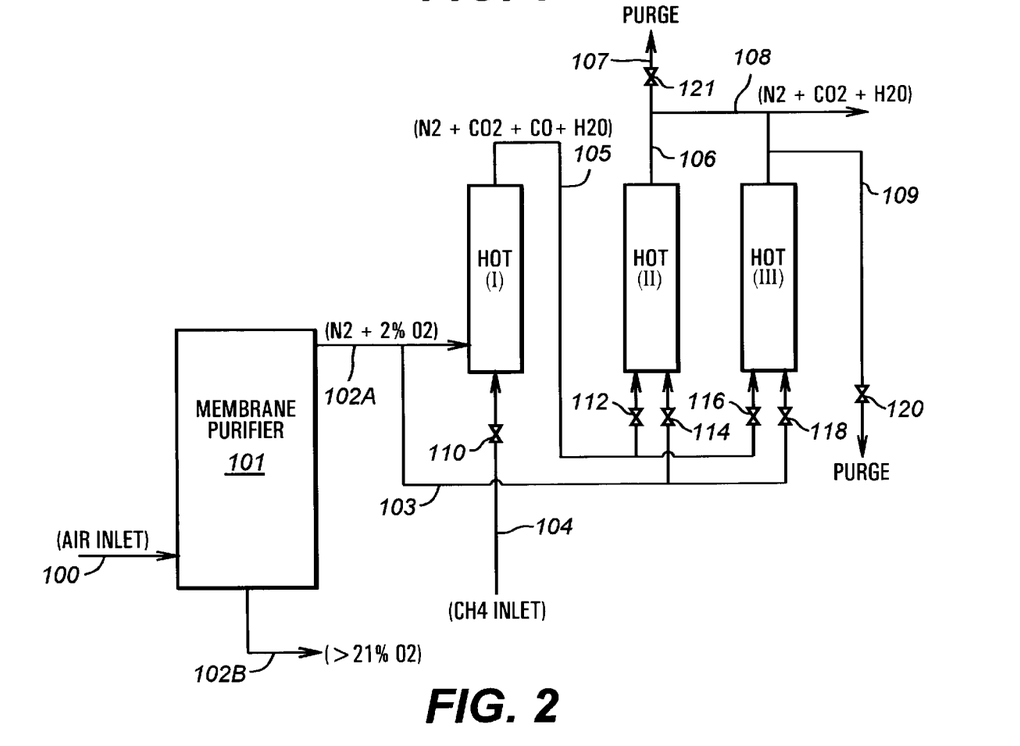
FIG. 2 illustrates many of the same features described in FIG. 1, however, FIG. 2 has two reactor beds instead of one to convert the carbon monoxide in a feed gas stream to carbon dioxide.

FIG. 2 illustrates many of the same features described in FIG. 1. However, FIG. 2 has two reactor beds instead of one to convert the carbon monoxide in stream 105 to carbon dioxide. Reactor bed (III), which also contains an oxidized metal, allows for cyclical switching between reactor bed (II) and reactor bed (III) using valves 112, 114, 116 and 118. Each of these beds may be alternatively oxidized with an oxygen-containing gas stream 103 while the other bed is converting the nitrogen-rich gas stream 105 to produce a purified nitrogen gas stream 108. The purified gas stream 108 contains almost pure nitrogen and very small quantities of carbon dioxide and water vapor, and practically no carbon monoxide. However, other gaseous impurities that are either inert or at very low concentration levels may also be present. Lines 107 and 109 are purge gas streams for reactor beds (II) and (III), respectively. These purge gas streams may be useful for initializing, testing, evaluation, and monitoring of individual bed performance, and are normally closed off by closing valves 120 and 121.

Alternatively, the process and apparatus of the invention may employ a parallel scheme wherein feed gas stream 105 is split to form a plurality of feed gas streams 105a, 105b . . . 105n, each of the feed gas streams passing through a corresponding plurality of reaction zones of corresponding reactor vessels, to produce a corresponding plurality of purified nitrogen streams 108a, 108b, . . . 108n, which may or may not be joined to form a final purified stream 108.

An additional and very important aspect of the present invention is that this gas purification process can be performed with very little regard to the overall flow rate of the inert gas. As long as there is a sufficient supply of metal oxide in one of the reactor beds, the flow rate of stream 105 may vary over a very wide range. The main advantage of the present invention is that relatively complicated analysis and control systems needed to continuously adjust inlet oxygen flow rates to match changes in the downstream nitrogen demand flow rates and, thus, upstream feed gas flow rates are not necessary.

EXAMPLES

The following examples are presented in further illustration of the present invention and should not be construed as unduly limiting the scope of the appended claims. All parts and percentages are by weight unless otherwise noted.

Example I

Formation of Palladium Oxide and Its Use in Converting CO to $CO_2$:

Several separate experiments were performed in order to prove that palladium oxide is capable of: 1) forming at 250° C. and 2) converting carbon monoxide to carbon dioxide at 250° C. In one of these experiments, a test reactor filled with 207.1 g of 0.5 percent palladium on alumina, available from DeGussa under the trade designation E252 P/D, was pretreated with hydrogen to fully reduce the (as received) material. This material was then fully oxidized at 250° C. using a flowing mixture of nitrogen and oxygen, with the mixture flowing at about 2.3 scfh (0.060 meters$^3$/hour) wherein the initial oxygen concentration in the nitrogen was about 85 ppm. After this oxidation reaction was completed (in approximately 7.5 hr as determined by measuring oxygen concentrations in the gas streams entering and exiting the "catalytic" reactor), another nitrogen gas stream (also flowing at about 2.3 scfh (0.060 meters$^3$/hour)) containing only carbon monoxide as the primary impurity (at approximately 200 ppm) was directed into the same bed of fully oxidized material maintained at 250° C. A time period of about 12.5 hr elapsed before the carbon monoxide concentration in the outlet gas stream exceeded 0.5 ppm. Carbon dioxide concentrations were also monitored in the outlet gases at the same time, and it was found that the carbon dioxide concentrations did not increase significantly in the outlet gas stream until approximately 6.5 hr after the start of this purification process step. This delay in the onset of carbon dioxide breakthrough is thought to be due to adsorption of carbon dioxide, within the "catalyst" bed, during the carbon monoxide-carbon dioxide conversion process. The concentrations, flow rates, and reaction times indicated in this example also signify a transfer of oxygen from the gas phase to form palladium oxide and then (in a subsequent step) a nearly quantitative transfer of oxygen between the palladium oxide and the carbon monoxide to form carbon dioxide.

In a separate experiment, the same test reactor (at 250° C.) was treated with a different mixture of flowing nitrogen and oxygen flowing at about 2.3 scfh (0.060 meters$^3$/hour) wherein the initial oxygen concentration in the nitrogen was about 76 ppm. After this oxidation reaction was completed (in approximately 9.0 hr), another flowing nitrogen gas stream (also flowing at about 2.3 scfb) containing only carbon monoxide as the primary impurity (at approximately 200 ppm) was directed into the same bed of fully oxidized material maintained at 250° C. In this case, a time period of about 13.5 hr elapsed before the carbon monoxide concentration in the outlet gas stream exceeded 0.5 ppm. Carbon dioxide concentrations were also monitored in the outlet gases at the same time, and it was found that the carbon dioxide concentrations did not increase significantly in this outlet gas stream until approximately 7.0 hr after the start of this purification process step.

These experimental results indicated that palladium oxide is capable of: 1) forming at 250° C. and 2) quantitatively (or nearly quantitatively) oxidizing carbon monoxide to carbon dioxide at 250° C.

Example II

Carbon Monoxide Oxidation Using 0.5 Percent Palladium Oxide

In this example, another batch of the same "catalyst" that was used in Example I was used with the following parameters:

Mass of "catalyst" loaded to form reaction zone=46.8 g

Length of Reaction Zone=7.62 cm (3.0 in)

Mass of Ceramic Pre-Heat (Inlet) Zone =275.9 g

Length of Ceramic Pre-Heat (Inlet) Zone=16.4 cm (6.5 in)

Mass of Ceramic Exit (Outlet) Zone=128.4 g

Length of Ceramic Exit (Outlet) Zone=7.6 cm (3.0 in)

Total Mass of Ceramic=404.3 g

Total Length of Ceramic=24.1 cm (9.5 in)

Overall Length of Reactor=39.9 cm (15.7 in)

Internal Thermocouple (From Gas Outlet End)=11.4 cm (4.5 in)

Reaction Zone Temperature=250° C.

Table 3 indicates the data collected using these parameters.

TABLE 3

Carbon Monoxide Oxidation Using 0.5 Percent Palladium Oxide[a]

| Gas Flow (m$^3$/hr) | System Pressur (kPa) | Gas Flow (scfh) | System Pressur (psig) | Inlet Concentrations (ppm) [CO] [$O_2$] | [$CO_2$] | Outlet Concentrations (ppm) [CO] [$O_2$] | [$CO_2$] |
|---|---|---|---|---|---|---|---|
| 0.026 | 108 | 1.00 | 0.9 | 155 <0.5 | 140 | <0.5 124 | 93 |
| 0.056 | 114 | 2.13 | 1.9 | 151 <0.5 | 145 | <0.5 134 | 80 |
| 0.300 | 208 | 11.41 | 15.5 | 151 <0.5 | 144 | <0.5 182 | 99 |
| 0.206 | 166 | 7.84 | 9.4 | 197 <0.5 | 99 | <0.5 193 | 9 |
| 0.318 | 216 | 12.1 | 16.7 | 178 <0.5 | 117 | <0.5 203 | 60 |
| 0.629 | 329 | 23.9 | 33.0 | 182 <0.5 | 114 | <0.5 155 | 38[b] |

[a]Inlet concentrations were estimated; outlet concentrations were measured; initial CO in reactor cylinder: [CO] = 295 ppm; initial $O_2$ in reactor cylinder: [$O_2$] = 296 ppm; $N_2$ corrected for air calibration FM = 1.021; Press. corr. (psig) = P + 0.3; gas flow rates corrected for $N_2$ and pressure; charged reactor pre-conditioned at 250° C. with 2.0 scfh (0.053 m$^3$/hr) of flowing $N_2$ containing about 80 ppm $O_2$ for 24 hr.
[b]P inlet was 33.0 psig (329 kPa), P outlet was 23.4 psig (263 kPa).

Example III

Carbon Monoxide Oxidation Using a 0.5 Percent Palladium Catalyst

In this example, another batch of the same "catalyst" that was used in Examples I and II was used with the following parameters:

Mass of "Catalyst" loaded into reactor=15.6 g
Length of Reaction Zone=2.54 cm (1.0 in)
Mass of Ceramic Pre-Heat (Inlet) Zone=247.9 g
Length of Ceramic Pre-Heat (Inlet) Zone =15.1 cm (5.96 in)
Mass of Ceramic Exit (Outlet) Zone=157.5 g
Length of Ceramic Exit (Outlet) Zone=9.63 cm (3.79 in)
Total Mass of Ceramic=405.4 g
Total Length of Ceramic=24.8 cm (9.75 in)
Overall Length of Reactor=39.1 cm (15.4 in)
Reactor OD/ID=3.81/3.20 cm (1.50/1.26 in)
Internal Thermocouple (From Gas Outlet End)=11.2 cm (4.4 in)
Reaction Zone Temperature=250° C.

The results using these parameters are reported in Table 4.

TABLE 4

Carbon Monoxide Oxidation Using a 0.5 Percent Palladium Catalyst[a]

| Gas Flow ($m^3$/hr) | System Pressur (kPa) | Gas Flow (scfh) | System Pressur (psig) | Inlet Concentrations (ppm) [CO] [$O_2$] | [$CO_2$] | Outlet Concentrations (ppm) [CO] [$O_2$] | [$CO_2$] |
|---|---|---|---|---|---|---|---|
| 0.023 | 140 | 7.7 | 5.6 | 180 <0.5 | 115 | <0.5 161 | 82[b] |
| 0.784 | 347 | 29.8 | 35.6 | 183 <0.5 | 112 | <0.5 165 | 30[c] |
| 1.496 | 622 | 56.9 | 75.5 | 190 <0.5 | 105 | <0.5 170 | 30[d] |

[a] Initial CO reactor cylinder: [CO] = 295 ppm; initial $O_2$ reactor cylinder: [$O_2$] = 294 ppm; $N_2$ corrected for air calibration FM = 1.021; gas flow rates corrected for $N_2$ and pressure; charged reactor pre-conditioned at 250° C. with 2.0 scfh (0.053 $m^3$/hr) of flowing $N_2$ containing about 80 ppm $O_2$ for 60 hr.; internal thermocouple: ca. 0.32 cm (⅛ in) below top of catalyst bed.
[b] P inlet was 5.6 psig (140 kPa), P outlet was 5.0 psig (136 kPa).
[c] P inlet was 35.6 psig (347 kPa), P outlet was 31.0 psig (315 kPa).
[d] P inlet was 75.5 psig (622 kPa), P outlet was 66.0 psig (556 kPa).

Example IV

Carbon Monoxide Oxidation Using Ceramic Bed Only

In this example, no "catalyst" was used on the support material, and the following parameters were employed:

Mass of "Catalyst" loaded into reactor=0.0 g
Length of Catalyst Zone=0.0 cm (0.0 in)
Total Mass of Ceramic=405.5 g
Length of Ceramic Zone=24.8 cm (9.75 in)
Overall Length of Reactor=39.9 cm (15.7 in)
Internal Thermocouple (From Gas Outlet End)=11.4 cm (4.5 in)
System Temperature=250° C.

The results are collected in Table 5.

TABLE 5

Carbon Monoxide Oxidation Using Ceramic Bed Only[a]

| Gas Flow ($m^3$/hr) | System Pressur (kPa) | Gas Flow (scfh) | System Pressure (psig) | Inlet Concentrations (ppm) [CO] [$O_2$] | [$CO_2$] | Outlet Concentrations (ppm) [CO] [$O_2$] | [$CO_2$] |
|---|---|---|---|---|---|---|---|
| 0.0418 | 111 | 1.59 | 1.42 | 196 <0.5 | 99 | 135 50 | 94 |
| 0.0510 | 113 | 1.94 | 1.75 | 164 <0.5 | 132 | 103 56 | >100 |
| 0.2062 | 166 | 7.84 | 9.35 | 197 <0.5 | 99 | 200 8 | >100 |

[a] Inlet concentrations were estimated; outlet concentrations were measured; initial CO in reactor cylinder: [CO] = 295 ppm; initial O2 in reactor cylinder: [O2] = 296 ppm; N2 corr. for air calib. FM = 1.021; Press. corr. (psig) = P + 0.3; gas flow rates corrected for N2 and pressure; charged reactor precon-ditioned at 250° C. with 2.0 scfh (0.0526 $m^3$/hr) of flowing nitrogen containing about 80 ppm O2 for 24 hr.;

This data illustrated that the ceramic packing was ineffective in converting carbon monoxide to carbon dioxide at 250° C. and at flow rates greater than ca. 7.8 scfh (0.206 m³/hr) at P=9.4 psig (166 kPa) [i.e., the "catalyst" must be present to cause the changes that were measured and documented as illustrated by the previous two examples].

Summary of Results for Examples I–IV

Example I (above) illustrated, using experimental data, that palladium oxide was capable of forming at 250° C. and was also capable of converting carbon monoxide to carbon dioxide at 250° C. Example II (above) illustrated the catalytic carbon monoxide to carbon dioxide conversion results that were obtained using a small scale laboratory reactor containing a 3.0 inch catalyst bed depth and operated at 250° C. Gas flow rates up to about 24 scfh (0.63 m³/hr) and internal pressures of about 33 psig (329 kPa) were employed during this study. Example III (above) illustrated the catalytic carbon monoxide to carbon dioxide conversion results that were obtained using a small scale laboratory reactor containing only a 1.0 inch (2.54 cm) catalyst bed depth and also operated at 250° C. Gas flow rates up to about 57 scflh (1.5 m³/hr) and internal pressures of about 75 psig (622 kPa) were employed during this study. Example IV (above) illustrated the fact that the catalytic support material alone (an alumina type of ceramic material) was almost completely ineffective in converting carbon monoxide to carbon dioxide under the same conditions that were effective in this conversion process when the metal oxide was present. This data (in Table 5) illustrated that the "catalyst" actually selected for this process is indeed responsible for the reactions that actually occur.

The present invention has been described in detail with respect to certain preferred embodiments. However, as is understood by those skilled in the art, variations and modifications can be made without any departure from the scope of the present invention as defined by the following claims.

What is claimed is:

1. A process for removing carbon monoxide from a feed gas stream comprising a major portion of an inert gas and not less than about 50 ppm carbon monoxide, said process comprising converting substantially all of said carbon monoxide to carbon dioxide by contacting said feed gas stream with a noble metal oxide in a reaction zone of a reactor vessel at conditions effective for said conversion to produce a purified gas stream comprising said inert gas and converted carbon dioxide, wherein the concentration of the carbon monoxide in the purified gas stream is less than 5 ppm, and said reaction zone is operated at a temperature ranging from about 100 to about 350° C.

2. The process according to claim 1, wherein said feed gas stream comprises from about 50 to 30,000 ppm carbon monoxide.

3. The process according to claim 1, wherein said feed gas stream comprises carbon monoxide varying in concentration.

4. The process according to claim 1, wherein said purified gas stream comprises less than about 1.0 ppm carbon monoxide.

5. The process according to claim 1, wherein substantially all of said metal oxide is reduced during contacting with said feed gas stream to form a reduced metal, and wherein said reduced metal is regenerated by contacting said reduced metal with an oxygen-containing regeneration gas stream at conditions effective to oxidize substantially all of said reduced metal to form said metal oxide.

6. The process according to claim 5, wherein said oxygen-containing regeneration gas stream is passed through said reaction zone along with said feed gas stream to regenerate said reduced metal in situ.

7. The process according to claim 1, wherein said feed gas stream is split to form a plurality of feed gas streams, each of said feed gas streams passing through a corresponding plurality of reaction zones of a corresponding plurality of reactor vessels.

8. The process according to claim 1, wherein at least one reactor bed comprises said metal oxide and is contacted with said feed gas stream to convert said carbon monoxide to said carbon dioxide, and at least one other reactor bed comprises said reduced metal and is contacted with an oxygen-containing regeneration gas stream to regenerate substantially all of said reduced metal to form oxidized metal.

9. The process according to claim 1, wherein said inert gas is nitrogen.

10. The process according to claim 1, wherein said noble metal oxide comprises a major portion of a primary noble metal oxide selected from the group consisting of palladium oxides, platinum oxides, and mixtures thereof, and a minor portion of a promoter metal oxide selected from the group consisting of copper oxides, silver oxides, cadmium oxides and any mixture thereof.

11. The process according to claim 10, wherein said primary metal oxide is a palladium oxide.

12. The process according to claim 11, wherein said palladium oxide is supported on alumina or on another inert support material.

13. The process according to claim 12, wherein said palladium (in a reduced condition) comprises between about 0.01 and 10.0 percent by weight of a total weight of said palladium plus alumina or other inert support material.

14. The process according to claim 13, wherein said palladium (reduced) comprises about 6.1 to about 1.0 percent by weight of the total weight of said palladium plus alumina or other inert support material.

15. The process according to claim 1 wherein said inert gas is selected from the group consisting of nitrogen, helium, neon, argon, xenon, krypton, and mixtures thereof.

16. A process for removing carbon monoxide from a feed gas stream comprising a major portion of nitrogen and from about 30 to about 50,000 ppm carbon monoxide, said process comprising the steps of:

(a) converting substantially all of said carbon monoxide to carbon dioxide by contacting said feed gas stream with a noble metal oxide by passing the feed gas stream through a reaction zone of a reactor vessel at conditions effective for said conversion to produce a reduced noble metal and a purified gas stream, the purified gas stream comprising nitrogen and carbon dioxide, wherein the concentration of the carbon monoxide in the purified gas stream is less than 5 ppm, and said conditions including a temperature ranging from about 100 to about 3500° C.; and (b) regenerating said reduced noble metal by contacting said reduced noble metal with an oxygen-containing regeneration gas stream at conditions effective to oxidize said reduced noble metal to form said oxidized noble metal.

17. A process for removing carbon monoxide from a feed gas stream consisting essentially of an inert gas and not less than about 50 ppm carbon monoxide, said process comprising converting substantially all of said carbon monoxide to carbon dioxide by contacting said feed gas stream with a noble metal oxide in a reaction zone of a reactor vessel at conditions effective for said conversion to produce a purified gas stream comprising said inert gas and carbon dioxide wherein the concentration of the carbon monoxide in the purified gas stream is less than 5 ppm, and said reaction zone is operated at a temperature ranging from about 100 to about 350° C.

* * * * *

UNITED STATES PATENT AND TRADEMARK OFFICE
CERTIFICATE OF CORRECTION

PATENT NO.   : 6,531,105 B1
DATED        : March 11, 2003
INVENTOR(S)  : Frederick Giacobbe, Erick Duchateau and Kevin McKean It is certified that error appears in the above-identified patent and that said Letters Patent is hereby corrected as shown below:

<u>Column 16,</u>
Line 29, please delete the number "6.1" and insert the number -- 0.1 --.

Signed and Sealed this

Thirteenth Day of January, 2004

JON W. DUDAS
*Acting Director of the United States Patent and Trademark Office*